(12) United States Patent
Pryor et al.

(10) Patent No.: US 11,967,744 B2
(45) Date of Patent: Apr. 23, 2024

(54) FUEL CELL VEHICLE WITH BYPASS VALVE CONTROL FOR CLEARING EXHAUST

(71) Applicant: Ford Global Technologies, LLC, Dearborn, MI (US)

(72) Inventors: Martin Dale Pryor, Canton, MI (US); Ryan Ma, Canton, MI (US); Craig Michael Mathie, White Lake Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 17/669,956

(22) Filed: Feb. 11, 2022

(65) Prior Publication Data
US 2023/0261226 A1 Aug. 17, 2023

(51) Int. Cl.
*H01M 8/04746* (2016.01)
*B60K 6/08* (2006.01)
*B63H 8/16* (2020.01)
*H01M 8/0438* (2016.01)

(52) U.S. Cl.
CPC .......... *H01M 8/04761* (2013.01); *B60K 6/08* (2013.01); *B63H 8/16* (2020.02); *H01M 8/0441* (2013.01); *H01M 8/04753* (2013.01); *H01M 2250/20* (2013.01)

(58) Field of Classification Search
CPC ......... H01M 8/04761; H01M 8/04753; H01M 8/0441; B60K 6/32; B60K 13/04
See application file for complete search history.

(56) References Cited

U.S. PATENT DOCUMENTS

| | | | | |
|---|---|---|---|---|
| 8,293,420 B2* | 10/2012 | Katano | ............. | H01M 8/04753 429/444 |
| 8,691,453 B2* | 4/2014 | Kanie | ............... | H01M 8/04089 429/444 |
| 8,709,670 B2* | 4/2014 | Niezabytowski | ............ | H01M 8/04507 180/65.1 |
| 8,956,778 B2* | 2/2015 | Zhang | ............... | H01M 8/04761 429/444 |
| 9,551,276 B2* | 1/2017 | Ossareh | ................. | F02M 26/34 |
| 9,758,096 B1* | 9/2017 | Valeri | .................... | G10K 15/02 |
| 2002/0034669 A1* | 3/2002 | Kobayashi | .......... | H01M 8/0435 429/432 |
| 2002/0083700 A1* | 7/2002 | Ellmer | .................... | F02B 37/04 60/303 |
| 2003/0049505 A1* | 3/2003 | Kameya | ............ | H01M 8/04761 429/415 |
| 2003/0109357 A1* | 6/2003 | Tabata | ................ | B60W 10/026 477/109 |

(Continued)

Primary Examiner — Jeffrey J Restifo
(74) Attorney, Agent, or Firm — Brooks Kushman PC; David B. Kelly

(57) ABSTRACT

A fuel cell vehicle includes a bypass valve positioned downstream of a compressor and upstream of a fuel cell stack to selectively direct airflow from the compressor to an exhaust bypassing the fuel cell in an attempt to clear a partially or fully obstructed exhaust pipe. The bypass valve may be opened by a controller when an exhaust throttle valve is at or near a wide-open throttle position. The controller may also increase compressor flow and adjust airflow to the fuel cell stack until compressor pressure, speed, or temperature exceed corresponding limits.

13 Claims, 3 Drawing Sheets

(56) References Cited

U.S. PATENT DOCUMENTS

| | | | |
|---|---|---|---|
| 2004/0188154 A1* | 9/2004 | Carlson | B60K 6/32 180/65.25 |
| 2007/0231639 A1* | 10/2007 | Yoshida | H01M 8/04768 429/444 |
| 2011/0097632 A1* | 4/2011 | Sumser | F02C 6/10 429/408 |
| 2013/0014729 A1* | 1/2013 | Saito | H01M 8/04432 123/458 |
| 2015/0285191 A1* | 10/2015 | Kitada | F02B 37/18 60/605.2 |
| 2016/0190618 A1* | 6/2016 | Asai | H01M 8/04231 429/446 |
| 2016/0204455 A1* | 7/2016 | Kemmer | H01M 8/04395 429/429 |
| 2017/0054166 A1* | 2/2017 | Rothschuh | H01M 8/04111 |
| 2017/0077534 A1* | 3/2017 | Guidry | H01M 8/04761 |
| 2018/0151901 A1* | 5/2018 | Janarthanam | H01M 8/04761 |
| 2018/0358639 A1* | 12/2018 | Yajima | H01M 8/04228 |
| 2018/0366749 A1* | 12/2018 | Maeshima | H01M 8/04432 |
| 2018/0375127 A1* | 12/2018 | Yamazaki | H01M 8/04303 |
| 2019/0160935 A1* | 5/2019 | Orozco Santos Coy | B60K 6/28 |
| 2021/0372412 A1* | 12/2021 | Kemmer | F04D 17/12 |
| 2021/0391587 A1* | 12/2021 | Yamamoto | H01M 8/04992 |
| 2022/0018302 A1* | 1/2022 | Simoson | F02D 41/3836 |
| 2022/0344683 A1* | 10/2022 | Ancimer | H01M 8/1018 |
| 2023/0187663 A1* | 6/2023 | Tripathi | H01M 8/04089 429/439 |
| 2023/0193840 A1* | 6/2023 | Dillen | F02D 19/0605 123/439 |

* cited by examiner

# FUEL CELL VEHICLE WITH BYPASS VALVE CONTROL FOR CLEARING EXHAUST

TECHNICAL FIELD

This disclosure relates to a fuel cell vehicle having a bypass valve controlled to reduce exhaust back pressure.

BACKGROUND

Fuel cell vehicles harness a chemical reaction between hydrogen and oxygen to generate electricity, and generally operate more efficiently when the oxygen and hydrogen reactants are pressurized. For the air (oxygen) supply system, this may be accomplished with an air compressor upstream of the fuel cell stack and a throttle valve downstream of the stack operated to control the pressure differential across the stack using sensors to measure the air flow and air pressure within system. The Fuel Cell Control Unit (FCCU) determines the target air flow rate and pressure to provide a requested power. The FCCU then adjusts the compressor speed and throttle valve position to obtain the desired air pressure and flow rate for different fuel cell power outputs. Airflow exits the system through an exhaust pipe after flowing through the throttle valve. If the exhaust pipe becomes partially or completely obstructed, such as when the vehicle encounters standing water, for example, the increased backpressure may result in a compressor surge due to low flow and high pressure.

SUMMARY

A fuel cell vehicle includes a bypass valve positioned downstream of a compressor and upstream of a fuel cell stack to selectively direct airflow from the compressor to an exhaust bypassing the fuel cell in an attempt to clear a partially or fully obstructed exhaust pipe. The bypass valve may be opened by a controller when an exhaust throttle valve is at or near a wide-open throttle position. The controller may also increase compressor flow and adjust airflow to the fuel cell stack until compressor pressure, speed, or temperature exceed corresponding limits.

In various embodiments, a vehicle includes a compressor, a fuel cell stack fluidly coupled to the compressor and configured to receive airflow from an outlet of the compressor, a bypass valve disposed between the compressor and the fuel cell stack and selectively coupling airflow from the compressor to an exhaust pipe, a throttle valve disposed in an exhaust flow from the fuel cell stack, and a controller programmed to control the bypass valve to direct at least a portion of the airflow from the compressor to the exhaust pipe in response to position of the throttle valve exceeding a threshold. The threshold may correspond to a wide open position of the throttle valve. The controller may be further programmed to adjust airflow to the fuel cell stack in response to the throttle valve being wide open. The controller may be further programmed to control the compressor to increase compressor airflow in response to the throttle valve being wide open. The controller may be further programmed to shutdown the compressor and fuel cell stack in response to at least one of compressor speed, compressor temperature, and compressor pressure ratio exceeding a corresponding limit. The bypass valve may fluidly couple the output from the compressor to the exhaust downstream of the throttle valve. The vehicle may also include a humidifier having a first inlet coupled to the bypass valve, a first outlet coupled to an inlet of the fuel cell stack, a second input coupled to an outlet of the fuel cell stack, and a second outlet coupled to the throttle valve. The bypass valve may be a modulated bypass valve wherein the controller controls position of the modulated bypass valve in response to the throttle valve being wide open. The humidifier may be downstream of the bypass valve, wherein the bypass valve is configured to selectively direct at least a portion of the airflow from the intercooler to the exhaust pipe downstream of the throttle valve.

In one or more embodiments, a method for controlling a fuel cell vehicle by a controller includes controlling a bypass valve positioned downstream of a compressor and upstream of a fuel cell stack in response to an exhaust throttle valve position being within a predetermined range of a wide-open throttle position, the bypass valve configured to selectively bypass the fuel cell stack and fluidly couple compressor outlet airflow to an exhaust of the fuel cell vehicle. The method may also include controlling the compressor to increase compressor flow in response to the exhaust throttle valve position being within the predetermined range of the wide-open throttle position. The method may also include adjusting airflow input of the fuel cell stack in response to the exhaust throttle valve position being within the predetermined range of the wide-open throttle position and opening of the bypass valve. The method may also include closing the bypass valve in response to cathode pressure of the fuel cell stack being below a corresponding threshold. The method may also include adjusting compressor speed in response to the cathode pressure of the fuel cell stack being below the corresponding threshold. The method may also include shutting down the compressor and the fuel cell stack when compressor pressure, compressor speed, or compressor temperature exceed corresponding thresholds.

In one or more embodiments, a fuel cell system having a compressor coupled to an inlet of a fuel cell and an exhaust throttle valve disposed between an outlet of the fuel cell and an exhaust pipe includes a bypass valve positioned downstream of the compressor and upstream of the fuel cell, the bypass valve controllable to open in response to a control signal to allow at least a portion of airflow from the compressor to bypass the fuel cell and flow directly to the exhaust throttle valve or the exhaust pipe. The controller may also be programmed to control the bypass valve to open when position of the exhaust throttle valve is within a predetermined range of a wide-open throttle position. The controller may be further programmed to increase airflow of the compressor in response to the position of the exhaust throttle valve being within the predetermined range of the wide-open throttle position. The controller may also be programmed to close the bypass valve in response to cathode pressure of the fuel cell stack being below an associated threshold. The controller may be further programmed to adjust the compressor speed in response to the cathode pressure of the fuel cell stack being below an associated threshold.

One or more embodiments according to the disclosure may have associated advantages. For example, embodiments according to the disclosure may use existing hardware and sensor feedback to identify a partially or fully obstructed exhaust pipe and take corrective control action in an attempt to clear the exhaust pipe.

DETAILED DESCRIPTION

Figure 1:
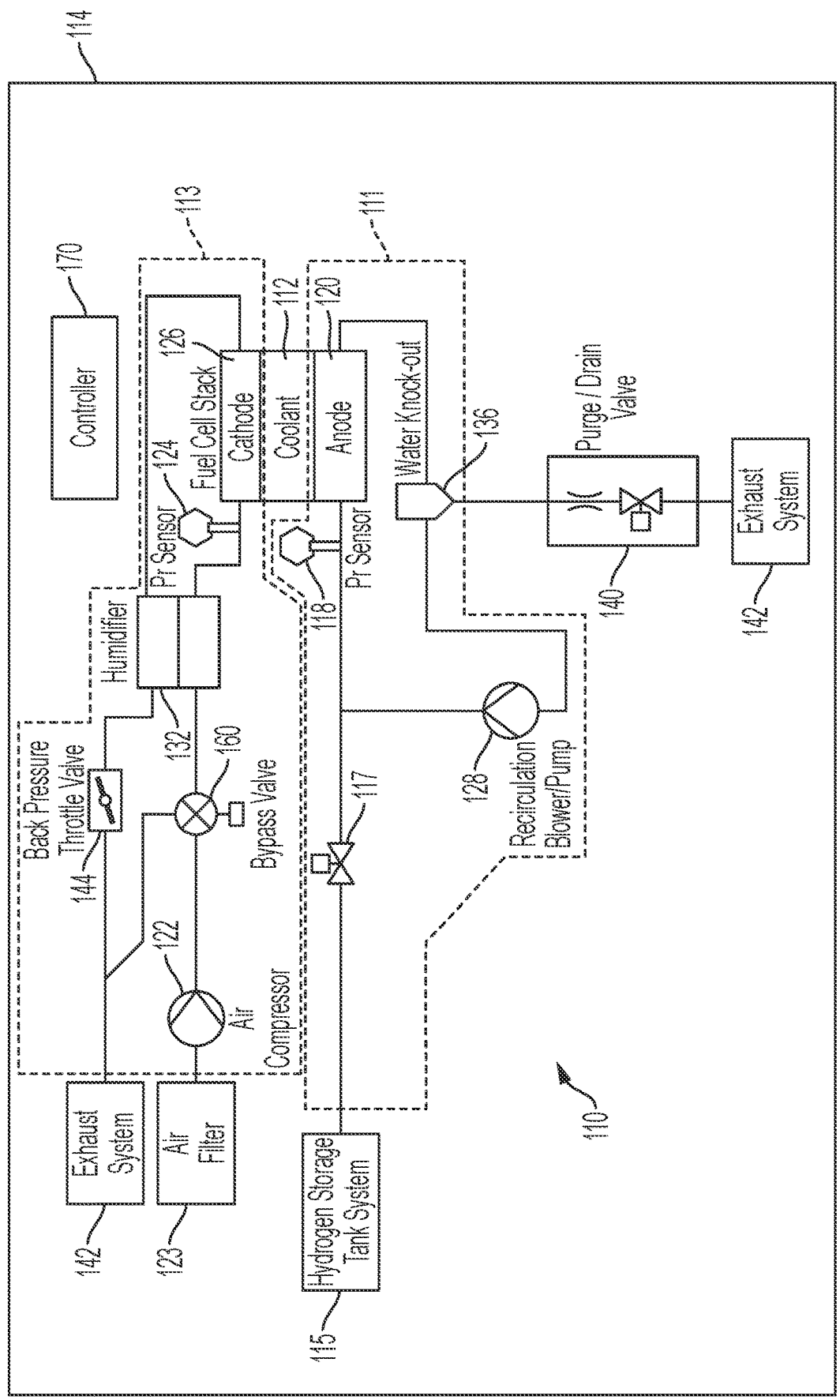
FIG. 1 is block diagram of a representative vehicle fuel cell system controlled to detect and mitigate an obstructed exhaust.

Embodiments of the present disclosure are described herein. It is to be understood, however, that the disclosed embodiments are merely examples and other embodiments can take various and alternative forms. The figures are not necessarily to scale and may be simplified; some features could be exaggerated, minimized, or omitted to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described, but within the scope of the claimed subject matter. The combinations of features illustrated provide representative embodiments for typical applications. Various combinations and modifications of the features consistent with the teachings of this disclosure, however, could be desired for particular applications or implementations.

Fuel cells require a fresh flow of air (oxygen) to generate electricity. Operation is generally more efficient when the reactants (air (cathode) and hydrogen (anode)) are pressurized. For the cathode subsystem, this may be accomplished with an air compressor upstream of the fuel cell stack and a throttle valve downstream of the fuel cell stack. Sensors may be provided to measure the airflow and air pressure within the cathode subsystem. A Fuel Cell Control Unit (FCCU) determines the target air flow rate and pressure for the requested power. The FCCU then adjusts the compressor speed and throttle valve position to obtain the desired air pressure and flow rate for different fuel cell power outputs.

After the air flows through the throttle valve, it exits the system through an exhaust pipe. Depending on the use of the vehicle, the end of the exhaust pipe may become partially or completely obstructed, such as when partially or fully submerged in water, for example. This will increase the back-pressure in the exhaust and, in the case of a fuel cell system with a centrifugal compressor, could cause the compressor to surge due to low flow and high pressure. In the case of a flooded or blocked exhaust pipe, the cathode subsystem pressure will rise due to the additional restriction in the exhaust pipe. The FCCU will see this rise in pressure and begin to open the throttle valve to try to reduce it. If the blockage is severe enough, the throttle will fully open and the pressure will still be too high. Embodiments according to this disclosure use the throttle valve position as a feedback signal for the controller to determine that the exhaust is partially or completely obstructed. Additional pressure may by applied to the exhaust in an attempt to clear the obstruction. However, simply increasing the compressor speed, without further mitigation strategies, may exacerbate the compressor surging issue since additional flow is required to generate more pressure.

As such, various embodiments of this disclosure detect that the exhaust pipe is obstructed (indicated by the throttle valve position being fully open or within a predetermined range of fully open without a significant change to back-pressure) and open a system bypass valve in response in an attempt to reduce pressure within the cathode subsystem and allow for additional flow and pressure capability from the fuel cell compressor. This in turn increases the ability to blow water or other obstructions out of the exhaust pipe. Once the blockage is cleared, or the vehicle is moved from standing water, the cathode pressure will be reduced and the FCCU will close the back pressure throttle valve to maintain cathode pressure. Once the throttle valve is no longer fully open, the FCCU will close the bypass valve, exit the mitigation strategy, and return to typical operation of the compressor and throttle valve.

FIG. 1 is block diagram of a representative vehicle fuel cell system controlled by a controller 170 to detect and mitigate an obstructed exhaust. Fuel cell system 110 includes an anode subsystem 111 configured to provide hydrogen fuel at a desired pressure, flow, and humidity to a fuel cell stack 112. Likewise, a cathode subsystem (loop) 113 is configured to provide oxygen (air) at a desired pressure, flow, and humidity to the fuel cell stack 112. As known in the art, electrical energy may be generated by the fuel cell stack 112 as the hydrogen and oxygen react. This electrical energy may be used to power various electrical devices of the vehicle, to power external electrical loads, to propel the vehicle, and/or be stored within a battery or other energy storage unit (not shown). For example, the fuel cell stack 112 may be configured to provide motive power for vehicle 114 via electrical connection to one or more electric machines (not shown) that convert electrical energy generated by the stack 112 to mechanical energy used to move the vehicle 114.

Fuel supply from a hydrogen storage tank system 115 is enabled by controller 170 with the supply pressure to the fuel cell stack 112 controlled by a pressure control device 117 that may be controlled by controller 170. The pressure control device 117 takes input from a pressure sensor 118 at the inlet of the fuel cell stack anode 120 to control the hydrogen fuel pressure to the stack 112. An air compressor 122 controlled by controller 170 increases the ambient pressure of air filtered by air filter 123 based on input from an air pressure sensor 124 at the inlet of the fuel cell stack cathode 126. Outlet airflow from compressor 122 may pass through bypass valve 160 before passing through humidifier 132 to supply cathode 126 with air (oxygen). Bypass valve 160 is controlled by controller 170 to selectively allow at least a portion of the airflow from compressor 122 to be directed to exhaust system 142 and bypass fuel cell stack 112 to mitigate an exhaust system obstruction as described in greater detail herein.

The system is generally controlled such that the pressure on either side of the fuel cell membrane (not shown) between anode 120 and cathode 126 is maintained within a certain tolerance, for example around 600 mbar. The tolerance may vary depending upon the fuel cell stack design. Any overpressure or under pressure may result in system shut down to protect the fuel cell stack membrane.

For efficient power generation, the fuel cell stack 112 may require humidified gases. Anode gas humidity may be maintained by recirculating the anode gas mixture from the fuel cell stack outlet using a blower 128 to mix feed gas from the hydrogen storage tank system 115 with the recirculated hydrogen. Cathode gas (air) humidity is maintained by passing air through a humidifier 132.

At the anode side of the fuel cell stack outlet, a water knock-out 136 and purge/drain valve 140 are provided to remove water from the anode outlet. This removed water is passed to exhaust system 142 of the vehicle 114. At the cathode side of the fuel cell stack outlet, a back pressure throttle valve 144 fluidly connects the humidifier 132 and the exhaust system 142. Position of throttle valve 144 and compressor 122 are controlled by controller 170 to maintain a desired cathode subsystem pressure. A throttle valve position signal may be used by controller 170 to determine when the throttle valve 144 is with a predetermined range of a wide-open throttle (WOT) position and/or at WOT position.

Figure 2:
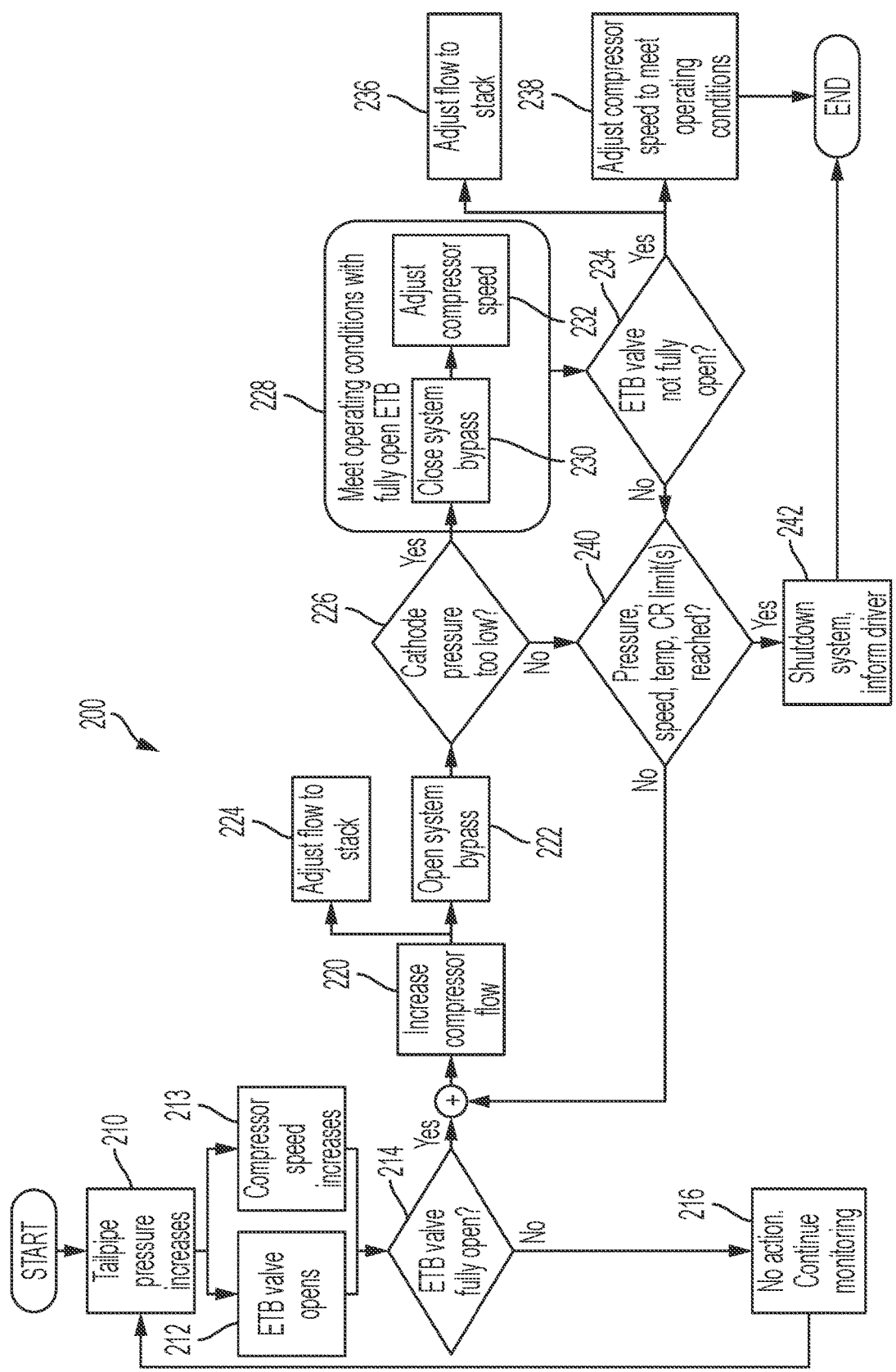
FIG. 2 is a block diagram illustrating operation of vehicle fuel cell system to detect and mitigate an obstructed exhaust.

Controller 170 may be implemented as a dedicated FCCU or may cooperate with one or more other controllers, such as a vehicle or powertrain controller to perform one or more control functions described herein. Control logic, functions, code, software, strategy etc. performed by one or more processors or controllers such as controller 170 and/or an FCCU may be represented by block diagrams or flow charts such as shown in FIG. 2. The flow chart 200 or block diagram of FIG. 2 illustrates a representative control strategy, algorithm, and/or logic for operation of a system or method for detecting and mitigating an exhaust obstruction in a fuel cell system according to the disclosure that may be implemented using one or more processing strategies such as event-driven, interrupt-driven, multi-tasking, multi-threading, and the like. As such, various steps or functions illustrated or described may be performed in the sequence as illustrated or described, in parallel, or in some cases omitted. Although not always explicitly illustrated or described, one of ordinary skill in the art will recognize that one or more of the steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, powertrain, and/or FCCU. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems.

An exhaust system or tailpipe obstruction may increase the exhaust back pressure as represented at 210. The obstruction may be a partial or complete obstruction, such as may occur when the tail pipe is partially or fully submerged in standing water, for example. The exhaust back pressure associated with cathode subsystem 113 may be monitored by controller 170 via an associated pressure sensor, such as pressure sensor 124. The increased exhaust back pressure may result in a corresponding change to the cathode subsystem pressure such that the controller opens the exhaust throttle backpressure (ETB) valve at 212 and increases the compressor speed at 213 to provide the desired airflow to the cathode to maintain desired stoichiometric reaction conditions within the fuel cell stack and provide the desired output power. This process continues as indicated at 216 until the throttle valve position reaches a fully open position (or is within a predetermined range of fully open) as represented at 214. The throttle valve position may be provided to the controller 170 by an associated position sensor associated with the throttle body. In one or more embodiments, block 214 may determine whether the throttle valve position is within a predetermined range of a wide-open or fully open position, such as greater than 90% or between 95%-100%, for example. As previously described, the control system will continue to adjust the throttle valve position as indicated by blocks 210-216 until block 214 determines that the throttle valve position is within the predetermined range or fully open.

Figure 3:
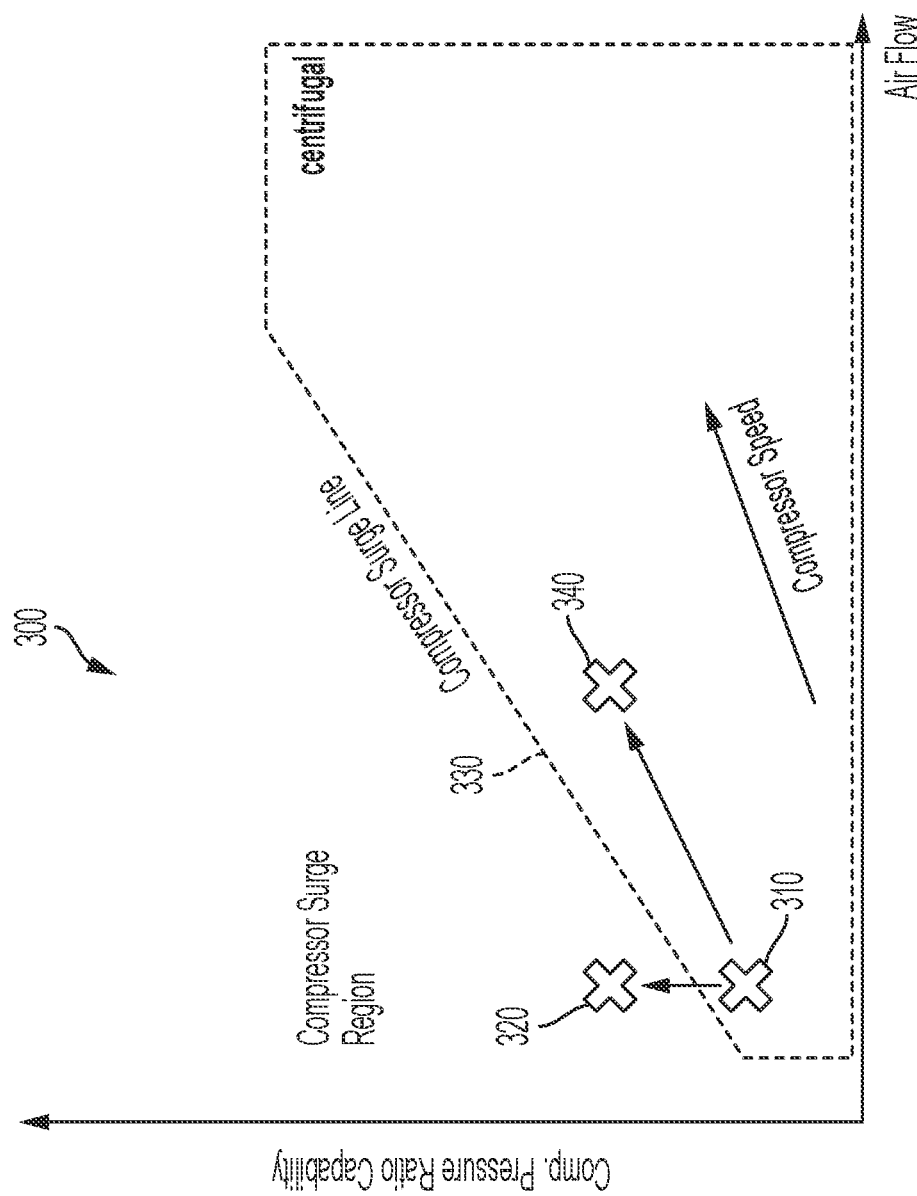
FIG. 3 illustrates operating regions of a fuel cell system compressor controlled to increase pressure while avoiding surge to clear an obstructed exhaust.

Controller 170 controls the compressor to increase compressor flow as indicated at 220 and opens the system bypass valve as indicated at 222 to provide the necessary airflow to the fuel cell stack while avoiding operation of the compressor in a surge region (see FIG. 3). As previously described, the system bypass valve directs at least a portion of airflow from the compressor output to the exhaust system bypassing the fuel cell stack to increase exhaust flow in an attempt to clear any obstruction and lower exhaust back pressure. Airflow to the fuel cell stack may also be adjusted as indicated at 224.

Block 226 determines whether the cathode pressure of the fuel cell stack is too low, i.e. below a desired target pressure for current operating conditions. If NO, then block 240 determines whether any compressor operating limits have been exceeded, which may include comparing compressor pressure, compressor speed, compressor temperature and/or compression ratio to corresponding limits. If any of the limits are exceeded, the system is shutdown and an associated message and/or diagnostic code is generated as indicated at 242.

If the cathode pressure is below a desired target value as determined at 226, then block 228 attempts to satisfy the current operating requirements by partially or fully closing the system bypass valve at 230 and adjusting the compressor speed at 232. If the exhaust backpressure throttle valve is not fully open as determined at 234, then the cathode airflow to the fuel cell stack is adjusted as indicated at 236 and the compressor speed is adjusted as indicated at 238 to meet current operating conditions. Otherwise, if the ETB valve is fully open as indicated at 234, then block 240 determines whether any compressor operating limits have been exceeded, which may include comparing compressor pressure, compressor speed, compressor temperature and/or compression ratio to corresponding limits. If any of the limits are exceeded, the system is shutdown and an associated message and/or diagnostic code is generated as indicated at 242.

FIG. 3 illustrates operating regions of a fuel cell system compressor controlled to increase pressure while avoiding surge to supply desired airflow to the fuel cell and clear an obstructed exhaust. Graph 300 plots compressor pressure ratio capability as a function of air flow. A normal operating point without any exhaust obstruction is represented at 310. Operating point 320 represents the compressor operating point that would be required to meet the fuel cell required air flow rate with an exhaust obstruction elevating the exhaust back pressure, which is in the compressor surge region above compressor surge line 330. Opening of the system bypass valve allows the controller to increase compressor speed to increase pressure and supply the fuel cell stack with a desired air flow rate for current operating conditions. The increased airflow through the compressor moves the compressor operating point to 340 avoiding the compressor surge region while supplying increased airflow and pressure to the exhaust to clear the obstruction, as well as satisfying the required cathode airflow to the fuel cell stack.

The processes, methods, or algorithms disclosed herein can be deliverable to/implemented by a processing device, processor, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, FLASH devices, MRAM devices and other non-transitory optical media. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software, and firmware components. While the algorithms, processes, methods, or steps may be illustrated and/or described in a sequential manner, various steps or functions may be performed simultaneously or based on a trigger or interrupt resulting in a different sequence or order than illustrated and described. Some processes, steps, or functions may be repeatedly performed whether or not illustrated as such. Similarly, various processes, steps, or functions may be omitted in some applications or implementations.

The representative embodiments described are not intended to encompass all possible forms within the scope of the claims. The words used in the specification are words of description rather than limitation, and it is understood that various changes can be made consistent with the teachings of the disclosure within the scope of the claimed subject matter. As previously described, one or more features of various embodiments can be combined to form further embodiments that may not be explicitly described or illustrated. Although embodiments that have been described as providing advantages over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
   a compressor;
   a fuel cell stack fluidly coupled to the compressor and configured to receive airflow from an outlet of the compressor;
   a bypass valve disposed between the compressor and the fuel cell stack and selectively coupling airflow from the compressor to an exhaust pipe;
   a throttle valve disposed in an exhaust flow from the fuel cell stack;
   an intercooler downstream of the compressor and upstream of the bypass valve;
   a humidifier downstream of the bypass valve, wherein the bypass valve is configured to selectively direct at least a portion of the airflow from the intercooler to the exhaust pipe downstream of the throttle valve; and
   a controller programmed to control the bypass valve to direct at least a portion of the airflow from the compressor to the exhaust pipe in response to position of the throttle valve exceeding a threshold.

2. The vehicle of claim 1 wherein the threshold corresponds to a wide open position of the throttle valve.

3. The vehicle of claim 2 wherein the controller is further programmed to adjust airflow to the fuel cell stack in response to the throttle valve being wide open.

4. The vehicle of claim 3 wherein the controller is further programmed to control the compressor to increase compressor airflow in response to the throttle valve being wide open.

5. The vehicle of claim 4 wherein the controller is further programmed to shutdown the compressor and fuel cell stack in response to at least one of compressor speed, compressor temperature, and compressor pressure ratio exceeding a corresponding limit.

6. The vehicle of claim 5 wherein the bypass valve fluidly couples output from the compressor downstream of the throttle valve.

7. A vehicle comprising:
   a compressor;
   a fuel cell stack fluidly coupled to the compressor and configured to receive airflow from an outlet of the compressor;
   a bypass valve disposed between the compressor and the fuel cell stack and selectively coupling airflow from the compressor to an exhaust pipe;
   a throttle valve disposed in an exhaust flow from the fuel cell stack;
   a humidifier having a first inlet coupled to the bypass valve, a first outlet coupled to an inlet of the fuel cell stack, a second input coupled to an outlet of the fuel cell stack, and a second outlet coupled to the throttle valve; and
   a controller programmed to control the bypass valve to direct at least a portion of the airflow from the compressor to the exhaust pipe in response to position of the throttle valve exceeding a threshold.

8. The vehicle of claim 1 wherein the bypass valve comprises a modulated bypass valve and wherein the controller controls position of the modulated bypass valve in response to the throttle valve being wide open.

9. A fuel cell system having a compressor coupled to an inlet of a fuel cell and an exhaust throttle valve disposed between an outlet of the fuel cell and an exhaust pipe, the system comprising:
   a bypass valve positioned downstream of the compressor and upstream of the fuel cell, the bypass valve controllable to open in response to a control signal to allow at least a portion of airflow from the compressor to bypass the fuel cell and flow directly to the exhaust throttle valve or the exhaust pipe;
   an intercooler downstream of the compressor and upstream of the bypass valve; and
   a humidifier downstream of the bypass valve, wherein the bypass valve is configured to selectively direct at least a portion of the airflow from the intercooler to the exhaust pipe downstream of the throttle valve.

10. The fuel cell system of claim 9 further comprising a controller programmed to control the bypass valve to open when position of the exhaust throttle valve is within a predetermined range of a wide-open throttle position.

11. The fuel cell system of claim 10 wherein the controller is further programmed to increase airflow of the compressor in response to the position of the exhaust throttle valve being within the predetermined range of the wide-open throttle position.

12. The fuel cell system of claim 11 wherein the controller is further programmed to close the bypass valve in response to cathode pressure of the fuel cell stack being below an associated threshold.

13. The fuel cell system of claim 12 wherein the controller adjusts the compressor speed in response to the cathode pressure of the fuel cell stack being below an associated threshold.

* * * * *